United States Patent
Nagai

(10) Patent No.: US 10,692,180 B2
(45) Date of Patent: Jun. 23, 2020

(54) IMAGE PROCESSING APPARATUS

(71) Applicant: Ricoh Company, Ltd., Tokyo (JP)

(72) Inventor: Tasuku Nagai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 99 days.

(21) Appl. No.: 16/104,354

(22) Filed: Aug. 17, 2018

(65) Prior Publication Data
US 2019/0122338 A1 Apr. 25, 2019

(30) Foreign Application Priority Data

Oct. 24, 2017 (JP) ................................ 2017-204947

(51) Int. Cl.
| | | |
|---|---|---|
| *G06T 3/40* | (2006.01) | |
| *H04N 1/393* | (2006.01) | |
| *G06K 15/02* | (2006.01) | |
| *G06K 15/22* | (2006.01) | |
| *H04N 1/40* | (2006.01) | |

(52) U.S. Cl.
CPC ........ *G06T 3/4023* (2013.01); *G06K 15/1843* (2013.01); *H04N 1/3935* (2013.01); *G06K 15/22* (2013.01); *H04N 1/40068* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,068,905 A * | 11/1991 | Hackett | ................. | G06T 3/4023 345/698 |
| 5,130,820 A * | 7/1992 | Hirota | ...................... | G06T 5/20 358/447 |
| 5,311,259 A * | 5/1994 | Moriya | .............. | G03G 15/5095 358/1.2 |
| 6,504,935 B1 * | 1/2003 | Jackson | ................. | G10H 1/125 381/61 |
| 8,340,462 B1 * | 12/2012 | Gigushinski | .......... | G06T 3/0093 348/806 |
| 2007/0047644 A1 * | 3/2007 | Lee | ...................... | H04N 19/176 375/240.1 |

(Continued)

FOREIGN PATENT DOCUMENTS

| | | |
|---|---|---|
| JP | 10-243218 | 9/1998 |
| JP | 2002-185780 | 6/2002 |

*Primary Examiner* — Zhiyu Lu
(74) *Attorney, Agent, or Firm* — Xsensus LLP

(57) ABSTRACT

An image processing apparatus includes a memory and circuitry. The circuitry is configured to calculate a pixel scale factor for each of pixel positions in a main scanning direction of an input image for a line based on a magnification. The circuitry is configured to store, in the memory, the pixel scale factors calculated for the line in order of pixel position. The circuitry is configured to read, in parallel, N-number of pixel scale factors of the pixel scale factors for the line in order of pixel position from the memory, in synchronization with parallel reading of N-number of pixels in the main scanning direction from the input image, where N represents an integer not smaller than 2. The circuitry is configured to multiply, in parallel, the N-number of pixels read from the input image by the respective N-number of pixel scale factors read from the memory.

1 Claim, 10 Drawing Sheets

(56) References Cited

U.S. PATENT DOCUMENTS

| | | | | |
|---|---|---|---|---|
| 2008/0253672 | A1* | 10/2008 | Segall | H04N 19/105 |
| | | | | 382/238 |
| 2009/0003457 | A1* | 1/2009 | Liu | H04N 19/105 |
| | | | | 375/240.25 |
| 2009/0003718 | A1* | 1/2009 | Liu | H04N 19/176 |
| | | | | 382/238 |
| 2010/0085247 | A1* | 4/2010 | Venkatraman | G01S 19/27 |
| | | | | 342/357.64 |
| 2013/0002781 | A1* | 1/2013 | Kamijo | G03G 15/043 |
| | | | | 347/118 |
| 2014/0233071 | A1* | 8/2014 | Kido | H04N 1/00013 |
| | | | | 358/3.26 |
| 2014/0328403 | A1* | 11/2014 | Lim | H04N 19/105 |
| | | | | 375/240.16 |

* cited by examiner

FIG. 2C

PIXEL SCALE FACTORS

| MAGNIFICATION | | | | | | | | | | | | |
|---|---|---|---|---|---|---|---|---|---|---|---|---|
| 1.5 | 2 | 1 | 2 | 1 | 2 | 1 | 2 | 1 | 2 | 1 | 2 | 1 ... TWO-PIXEL CYCLE |
| 2.25 | 3 | 1 | 1 | 1 | 3 | 1 | 1 | 1 | 3 | 1 | 1 | 1 ... FOUR-PIXEL CYCLE |
| 2.5 | 3 | 2 | 3 | 2 | 3 | 2 | 3 | 2 | 3 | 2 | 3 | 2 ... TWO-PIXEL CYCLE |
| 3.125 | 4 | 3 | 3 | 3 | 3 | 3 | 4 | 3 | 3 | 3 | 3 | 3 ... EIGHT-PIXEL CYCLE |

IMAGE PROCESSING APPARATUS

CROSS-REFERENCE TO RELATED APPLICATIONS

This patent application is based on and claims priority pursuant to 35 U.S.C. § 119(a) to Japanese Patent Application No. 2017-204947, filed on Oct. 24, 2017, in the Japan Patent Office, the entire disclosure of which is hereby incorporated by reference herein.

BACKGROUND

Technical Field

Embodiments of the present disclosure relate to an image processing apparatus.

Related Art

Image processing apparatuses installed in printers, facsimile machines, or the like execute a scaling process for enlarging an input image having a low resolution according to a resolution suitable for a plotter engine.

SUMMARY

In one embodiment of the present disclosure, a novel image processing apparatus includes a memory and circuitry. The circuitry is configured to calculate a pixel scale factor for each of pixel positions in a main scanning direction of an input image for a line based on a magnification. The circuitry is configured to store, in the memory, the pixel scale factors calculated for the line in order of pixel position. The circuitry is configured to read, in parallel, N-number of pixel scale factors of the pixel scale factors for the line in order of pixel position from the memory, in synchronization with parallel reading of N-number of pixels in the main scanning direction from the input image, where N represents an integer not smaller than 2. The circuitry is configured to multiply, in parallel, the N-number of pixels read from the input image by the respective N-number of pixel scale factors read from the memory.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 2C is a diagram illustrating the relationship between magnification and repeat cycle;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
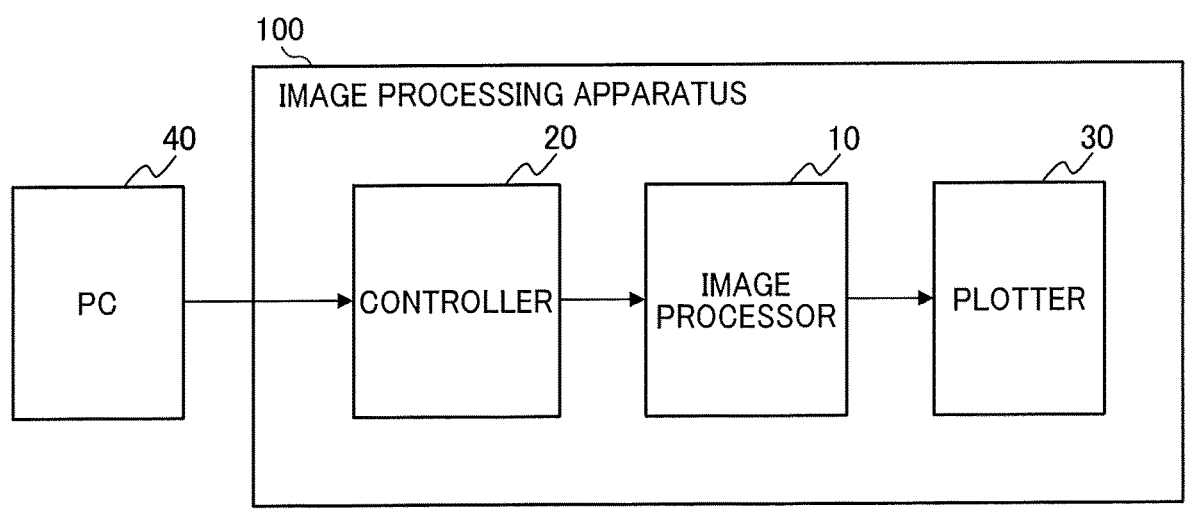
FIG. 1 is a block diagram illustrating a system configuration of an image processing apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

First Embodiment

Initially with reference to FIG. 1, a description is given of an image processing apparatus 100 according to an embodiment of the present disclosure.

FIG. 1 is a block diagram illustrating a system configuration of the image processing apparatus 100.

As illustrated in FIG. 1, the image processing apparatus 100 includes a controller 20, an image processor 10, and a plotter 30.

The controller 20 receives print data from a computer, such as a personal computer (PC) 40, and develops the print data into image data. Then, the controller 20 inputs the image data into the image processor 10. The image processor 10 executes a scaling process on the image data (hereinafter referred to as an input image) input from the controller 20. The scaling process herein refers to a process of scaling a low-resolution input image based on appropriate magnification for matching the resolution of the input image with an output resolution of a plotter engine. Thereafter, the image processor 10 outputs the image data thus scaled (hereinafter occasionally referred to as an enlarged image) to the plotter 30. The plotter 30 prints the enlarged image on a recording medium such as a sheet of paper.

Figure 2A:
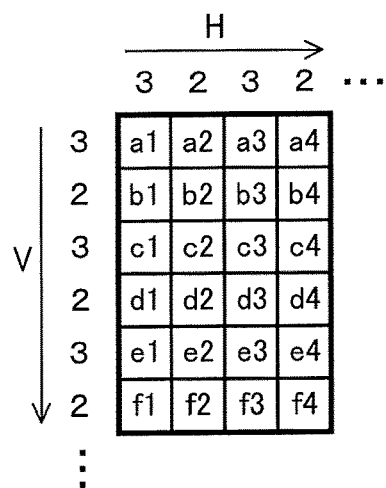
FIG. 2A is a diagram of an input image.
Figure 2B:
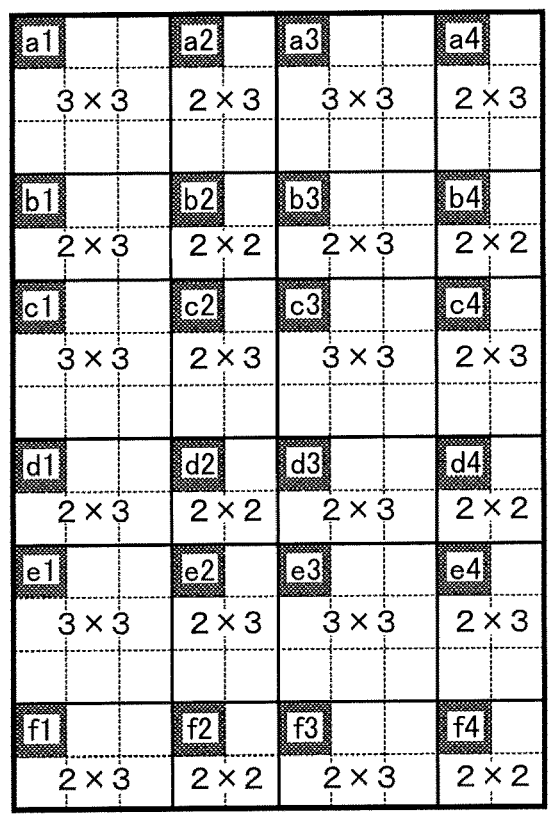
FIG. 2B is a diagram of an output image.

Referring now to FIGS. 2A to 2C, a description is given of a mechanism of the scaling process.

FIG. 2A is a diagram of an input image. FIG. 2B is a diagram of an output image. FIG. 2C is a diagram illustrating the relationship between magnification and repeat cycle.

In the scaling process, an enlarged image is generated by scaling or integrally multiplying each piece of pixel data constructing an input image in a main scanning direction and a sub-scanning direction, based on a certain magnification S determined. Hereinafter, an integer scale factor in the main scanning direction is referred to as a main-scanning pixel scale factor H. An integer scale factor in the sub-scanning direction is referred to as a sub-scanning pixel scale factor V. The main-scanning pixel scale factor H may be hereinafter abbreviated as "pixel scale factor H". Similarly, the sub-scanning pixel scale factor V may be hereinafter abbreviated as "pixel scale factor V". The pixel scale factor H and the pixel scale factor V may be collectively referred to as a pixel scale factor.

In a case in which the magnification S is an integer, each of the pixel scale factor H and the pixel scale factor V is an integer S. An enlarged image is generated by uniformly multiplying all the pixels constructing the input image in the main scanning direction and the sub-scanning direction by S.

On the other hand, depending on the relationship between an input resolution and an output resolution, the magnification S may be a real number including decimals, instead of a nice round number. A scaling process executed in such a case is hereinafter referred to as "decimal scaling" to distinguish between the decimal scaling and the scaling process in which the magnification S is an integer.

In the decimal scaling in which the magnification S is a real number including decimals, an integer (P+1) or an integer P is assigned as a pixel scale factor to each pixel so as to obtain an average S of the pixel scale factors assigned to individual pixels constructing the input image, where P represents an integer part of the magnification S.

Specifically, in the decimal scaling, as illustrated in FIG. 2A, a common pixel scale factor H is assigned to each pixel position in the main scanning direction of input lines of the input image while a common pixel scale factor V is assigned to each line position in the sub-scanning direction of the input image. In a case in which the magnification S is 2.5 (i.e., S=2.5), as illustrated in FIG. 2B, as the pixel scale factors H of individual pixels, "3" and "2" are alternated in the main scanning direction from the first pixel of each input line (i.e., a1, b1, c1, d1, e1, and f1). On the other hand, as the pixel scale factors V for individual pixels, "3" and "2" are alternated in the sub-scanning direction from the first line (i.e., line "a") of the input lines. In such a case, the pixel scale factor H and the pixel scale factor V have a repeat cycle of two pixels in the main scanning direction and the sub-scanning direction, respectively. Specifically, a sequence of pixel scale factors "3" and "2" is repeated in the main scanning direction and the sub-scanning direction.

When the input image is scaled, the individual pixels constructing the input image are multiplied by the respective pixel scale factors. Specifically, as illustrated in FIG. 2B, a pixel "a1" is tripled in both the main scanning direction and the sub-scanning direction. A pixel "a2" is doubled in the main scanning direction and tripled in the sub-scanning direction. A pixel "b1" is tripled in the main scanning direction and doubled in the sub-scanning direction. Similar scaling is performed for the remaining pixels. Thus, all the pixels constructing the input image are multiplied by the individually-determined pixel scale factors (H, V) to consequently obtain an enlarged image that is 2.5 times larger than the input image. In other words, the input image of FIG. 2A is magnified 2.5 times as the output image of FIG. 2B.

Note that the repeat cycle of the pixel scale factors (i.e., the number of pixels constructing a repeated unit of pixel scale factors) in the decimal scaling depends on a determined value of the magnification S. For example, as illustrated in FIG. 2C, in a case in which the magnification S is 1.5 (i.e., S=1.5), the pixel scale factors have a repeat cycle of two pixels (i.e., two-pixel cycle). That is, a sequence of pixel scale factors "2" and "1" is repeated. In a case in which the magnification S is 2.25 (i.e., S=2.25), the pixel scale factors have a repeat cycle of four pixels (i.e., four-pixel cycle). That is, a sequence of pixel scale factors "3", "2", "2", and "2" is repeated. In a case in which the magnification S is 2.5 (i.e., S=2.5), the pixel scale factors have a repeat cycle of two pixels (i.e., two-pixel cycle). That is, a sequence of pixel scale factors "3" and "2" is repeated. In a case in which the magnification S is 3.125 (i.e., S=3.125), the pixel scale factors have a repeat cycle of eight pixels (i.e., eight-pixel cycle). That is, a sequence of pixel scale factors "4", "3", "3", "3", "3", "3", "3", and "3" is repeated.

Figure 3:
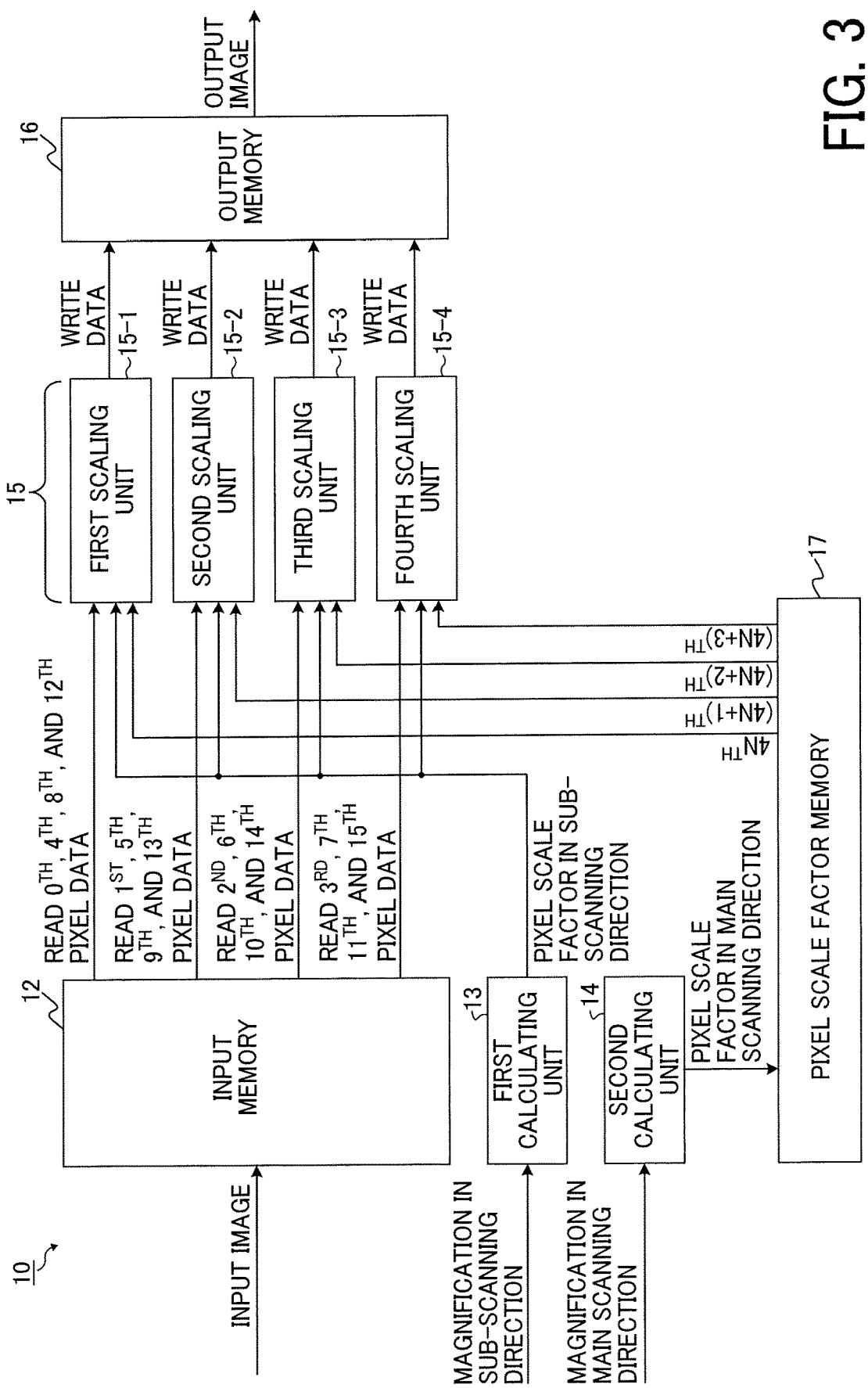
FIG. 3 is a functional block diagram of an image processor according to a first embodiment of the present disclosure.

Referring now to FIG. 3, a description is given of a functional configuration of the image processor 10 according to the first embodiment.

FIG. 3 is a functional block diagram of the image processor 10.

As illustrated in FIG. 3, the image processor 10 includes an input memory 12, a first calculating unit 13, a second calculating unit 14, a scaling unit 15, an output memory 16, and a pixel scale factor memory 17.

The input memory 12 is a buffer memory to temporarily store an input image received from the controller 20.

The first calculating unit 13 calculates the sub-scanning pixel scale factor V (i.e., pixel scale factor in the sub-scanning direction) for each of input lines of the input image based on a certain magnification S determined by the controller 20.

The second calculating unit 14 calculates the main-scanning pixel scale factor H (i.e., pixel scale factor in the main scanning direction) for each of pixel positions in the main scanning direction of the input image based on the certain magnification S determined by the controller 20.

The pixel scale factor memory 17 stores values of the pixel scale factors H calculated for one line by the second calculating unit 14. In the present embodiment, e.g., a static random access memory (SRAM) implements the pixel scale factor memory 17.

The scaling unit 15 reads each of the pixels constructing the input image from the input memory 12 to scale the input image. In the present embodiment, the scaling unit 15 is constructed of four equivalent scaling units, namely, a first scaling unit 15-1, a second scaling unit 15-2, a third scaling unit 15-3, and a fourth scaling unit 15-4. The four scaling units 15-1 to 15-4 cooperate to execute the scaling process of the input image in parallel. Thus, the present embodiment enhances the processing speed, compared to a typical configuration in which the process of calculation of the pixel scale factor and multiplication of the pixel by the pixel scale factor is executed for each of pixels constructing an input image one by one.

The output memory 16 is a buffer memory to temporarily store scaled data from the four scaling units 15-1 to 15-4.

With continued reference to FIG. 3, a detailed description is now given of the scaling process executed by the image processor 10. Note that the following will describe an example in which the size of one line of an input image is 16 pixels.

In the present embodiment, before the input image is stored in the input memory 12, the second calculating unit 14 calculates the pixel scale factor H for each of the sixteen pixel positions in the main scanning direction of the input line, and stores the sixteen pixel scale factors H thus calculated in the pixel scale factor memory 17. A description is now given of how the second calculating unit 14 calculates the pixel scale factor H.

First, the second calculating unit 14 obtains "α" from formula (1) below, based on the magnification S including an integer part P.

$$\alpha = \frac{S - P - 1}{P - S} \quad (1)$$

Next, the second calculating unit 14 calculates an integer (P+1) as the pixel scale factor H of the first pixel position of the input line that includes sixteen pixels. Then, the second calculating unit 14 calculates an integer P as the uniform pixel scale factors H of the subsequent "α" number of pixel positions. Then, the second calculating unit 14 calculates the integer (P+1) as the pixel scale factor H of the next pixel position. Then, the second calculating unit 14 calculates the integer P as the uniform pixel scale factors H of the subsequent "α" number of pixel positions. Thus, the second calculating unit 14 repeats the procedure described above to complete calculation of the pixel scale factor H of each of the sixteen pixel positions.

For example, in a case in which the magnification S is "3.125", that is, S=3.125, 3 is the integer P (i.e., P=3). From the formula (1) above, "α" is obtained as 7 (i.e., α=7). The second calculating unit 14 obtains "4" as the pixel scale factor H of the first pixel position. Then, the second calculating unit 14 obtains "3" as the uniform pixel scale factors H of the subsequent seven pixel positions. Then, the second calculating unit 14 obtains "4" as the pixel scale factor H of the next pixel position. Then, the second calculating unit 14 obtains "3" as the uniform pixel scale factors H of the subsequent seven pixel positions. Thus, the second calculating unit 14 obtains the pixel scale factor H for each of the sixteen pixel positions, and completes calculation of the pixel scale factors H. Thereafter, the second calculating unit 14 writes, in pixel scale factor memory 17, the sixteen pixel scale factors H thus obtained, in order of pixel position.

When the input image is stored in the input memory 12 after the sixteen pixel scale factors H are written in the pixel scale factor memory 17 in order of pixel position, the four scaling units 15-1 to 15-4 read, in parallel, four pieces of pixel data in the main scanning direction for each cycle, from the input image stored in the input memory 12. In synchronization with the parallel reading of pixel data, the four scaling units 15-1 to 15-4 read, in parallel, four pixel scale factors H in order of pixel position from the sixteen pixel scale factors H stored in the pixel scale factor memory 17.

Specifically, for each cycle, the first scaling unit 15-1 reads the 4Nth pixel scale factor H. The second scaling unit 15-2 reads the (4N+1)-th pixel scale factor H. The third scaling unit 15-3 reads the (4N+2)-th pixel scale factor H. The fourth scaling unit 15-4 reads the (4N+3)-th pixel scale factor H. Here, N takes values 0, 1, 2, and 3 in this order. When reading all the sixteen pixel scale factors H (i.e., N=3), each of the four scaling units 15-1 to 15-4 repeats the reading procedure described above back from the first reading position (i.e., N=0).

Next, each of the four scaling units 15-1 to 15-4 scales, in the main scanning direction, the pixel data read from the input memory 12 for each cycle, based on the pixel scale factor H read in the same cycle, and writes the pixel data thus scaled in the output memory 16 one by one. Thus, all pieces of pixel data constructing the input image are scaled and written in the output memory 16 as an enlarged image. The enlarged image stored in the output memory 16 is output to the plotter 30 as an output image.

Figure 4:
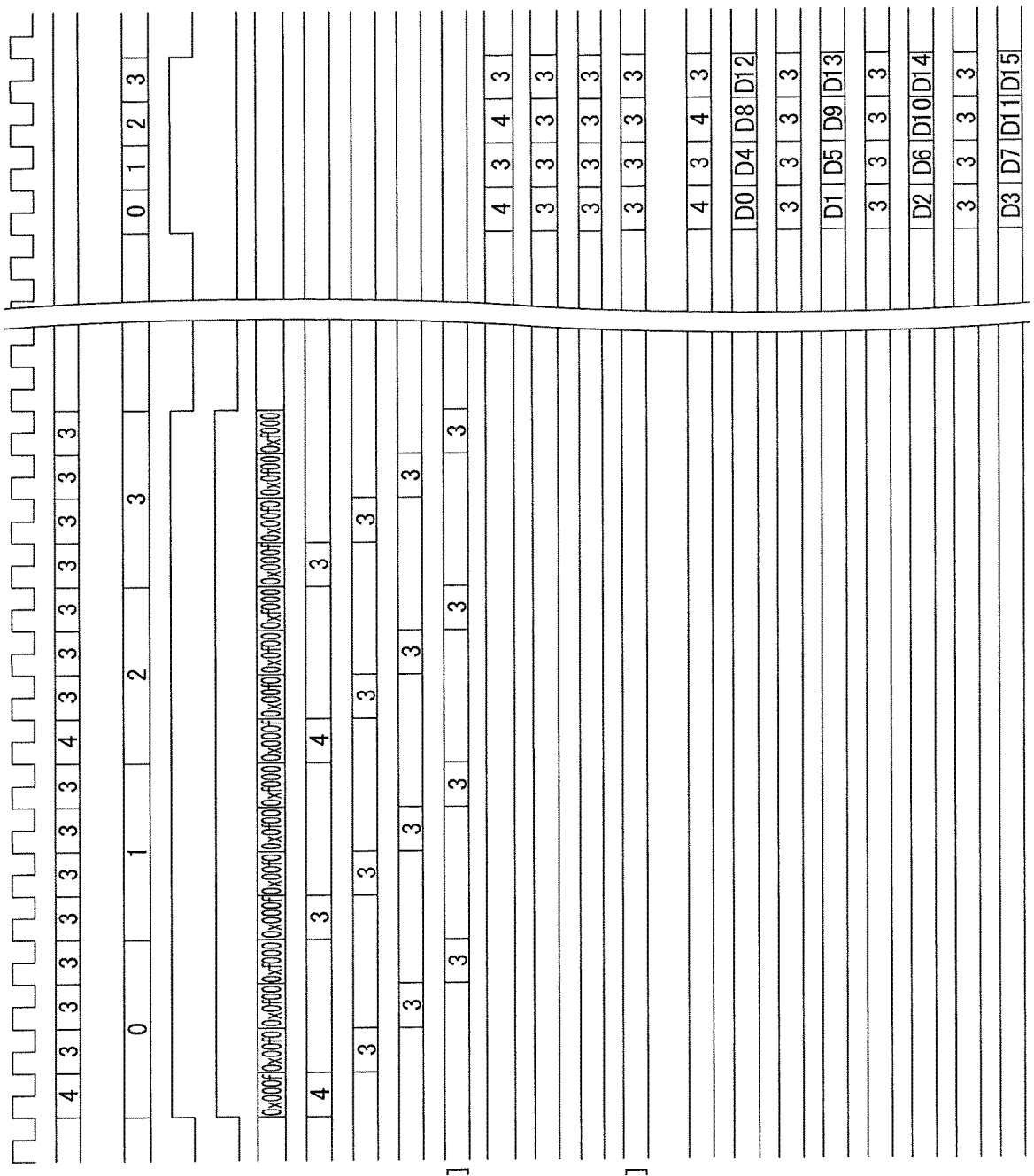
FIG. 4 is a timing chart of a scaling process executed by the image processor according to the first embodiment of the present disclosure.

Referring now to FIG. 4, a description is given of the timing of the scaling process described above.

FIG. 4 is a timing chart of the scaling process executed by the image processor 10.

Note that FIG. 4 illustrates the case in which the magnification S is 3.125 (i.e., S=3.125). The following items (1) to (5) indicate the meanings of terms used in FIG. 4:

(1) CLK: clock for processing;
(2) HRATE_CALC: calculated main-scanning pixel scale factor H;
(3) HRATE n: main-scanning pixel scale factor H input into the n-th scaling unit 15-n;
(4) DATA n: pixel data input into the n-th scaling unit 15-n; and
(5) RAM_****: control signals of the pixel scale factor memory 17.

Note that, in item (4), pixel data includes D0 to D15, where D0 represents the zeroth pixel and D15 represents the fifteenth pixel. In item (5), the control signals include the followings:

RAM_ADDR: address;
RAM_CE: chip enable;
RAM_WE: write enable;
RAM_WDATA: write data;
RAM_RDATA: read data; and
RAM_CBE[15:0]: bit enable.

Note that, with respect to RAM_WE, 1 indicates writing operation and 0 indicates reading operation. With respect to RAM_CBE[15:0], RAM_WDATA[3:0] is enabled when RAM_CBE[15:0] indicates 0x000f. RAM_WDATA[7:4] is enabled when RAM_CBE[15:0] indicates 0x00f0. RAM_WDATA [11:8] is enabled when RAM_CBE[15:0] indicates 0x0f00. RAM_WDATA[15:12] is enabled when RAM_CBE[15:0] indicates 0xf000.

In the present embodiment, the pixel scale factor memory 17 is a 16-bit bus memory to store a value for one pixel per four bits as below:

bit [3:0]: the 4Nth pixel;
bit [7:4]: the (4N+1)-th pixel;
bit [11:8]: the (4N+2)-th pixel; and
bit [15:12]: the (4N+3)-th pixel.

In the present embodiment, one pixel scale factor H is calculated for each cycle and, at the same time, RAM_WDATA is enabled in the order of [3:0], [7:4], [11:8], and [15:12]. The address is switched per four cycles. As a consequence, four pixel scale factors H of the 4Nth pixel, the (4N+1)-th pixel, the (4N+2)-th pixel, and the (4N+3)-th pixel are written in each of Addresses 0 to 3 of the pixel scale factor memory 17 in sixteen cycles.

In the example of FIG. 4, four pixel scale factors H (i.e., "4", "3", "3", and "3") of the zeroth to third pixels are written in Address 0. Four pixel scale factors H (i.e., "3", "3", "3", and "3") of the fourth to seventh pixels are written in Address 1. Four pixel scale factors H (i.e., "4", "3", "3", and "3") of the eighth to eleventh pixels are written in Address 2. Four pixel scale factors H (i.e., "3", "3", "3", and "3") of the twelfth to fifteenth pixels are written in Address 3.

When an input image is stored in the input memory 12 after the sixteen pixel scale factors H are written in the pixel scale factor memory 17, the four scaling units 15-1 to 15-4 read, in parallel, four pieces of pixel data in the main scanning direction from the input memory 12 for each cycle. At the same time, the four scaling units 15-1 to 15-4 read, in parallel, four pixel scale factors H of the 4Nth pixel, the (4N+1)-th pixel, the (4N+2)-th pixel, and the (4N+3)-th pixel from each of Addresses 0 to 3 of the pixel scale factor memory 17 to execute the scaling process.

In the example of FIG. 4, in the first cycle, the first scaling unit 15-1 simultaneously reads the zeroth main-scanning pixel scale factor "4" and the pixel data D0 of the zeroth pixel to quadruple the pixel data D0 in the main scanning direction. The second scaling unit 15-2 simultaneously reads the first main-scanning pixel scale factor "3" and the pixel data D1 of the first pixel to triple the pixel data D1 in the main scanning direction. The third scaling unit 15-3 simultaneously reads the second main-scanning pixel scale factor "3" and the pixel data D2 of the second pixel to triple the pixel data D2 in the main scanning direction. The fourth scaling unit 15-4 simultaneously reads the third main-scanning pixel scale factor "3" and the pixel data D3 of the third pixel to triple the pixel data D3 in the main scanning direction. Thus, in the following cycles, each of the four scaling units 15-1 to 15-4 repeats substantially the same process as described above.

As described above, according to the present embodiment, four pixels are scaled in parallel for each cycle, thereby quadrupling the typical processing speed. Here, in the decimal scaling, the repeat cycle of the pixel scale factors (i.e., the number of pixels constructing a repeated unit of pixel scale factors) depends on a determined value of the magnification S. According to the present embodiment, regardless of the value of the repeat cycle, correct pixel scale factors for four pixels are simultaneously read from the pixel scale factor memory 17 and input into the four scaling units 15-1 to 15-4, respectively, in parallel. As a consequence, correct processing results are obtained.

Second Embodiment

Figure 5:
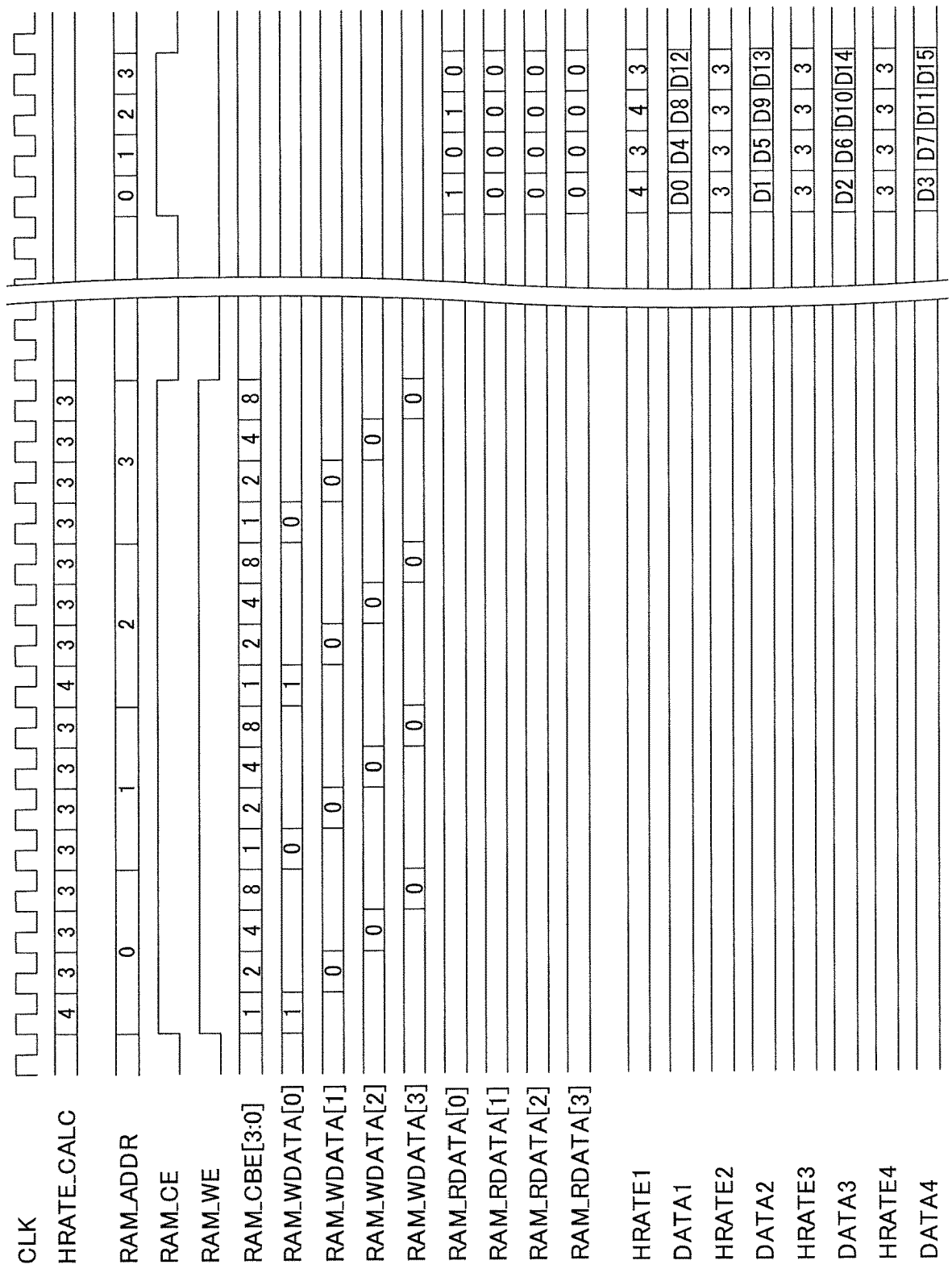
FIG. 5 is a timing chart of a scaling process according to a second embodiment of the present disclosure.

Referring now to FIG. 5, a description is given of a second embodiment of the present disclosure, concentrating on differences from the first embodiment.

FIG. 5 is a timing chart of a scaling process according to the second embodiment.

In the first embodiment described above, the pixel scale factor H is stored in the pixel scale factor memory 17. By contrast, in the second embodiment, a difference value between the pixel scale factor H and an integer part of the magnification S is stored in the pixel scale factor memory 17.

As described above, in the decimal scaling, either the integer (P+1) or the integer P is calculated as the pixel scale factor H, where P represents the integer part of the magnification S. In the first embodiment, the pixel scale factor H thus calculated is stored in the pixel scale factor memory 17. In the second embodiment, instead of the pixel scale factor H, the difference value (i.e., 1 or 0) between the integer P and the pixel scale factor H thus calculated is stored in the pixel scale factor memory 17 in order of pixel position.

FIG. 5 illustrates a timing chart of the present embodiment, in which the magnification S is 3.125 (i.e., S=3.125).

Note that the pixel scale factor memory 17 of the present embodiment is a 4-bit bus memory to store a difference value for one pixel per bit as below:
  bit [0]: the 4Nth pixel;
  bit [1]: the (4N+1)-th pixel;
  bit [2]: the (4N+2)-th pixel; and
  bit [3]: the (4N+3)-th pixel.

In the present embodiment, one pixel scale factor H is calculated for each cycle and, at the same time, RAM_W-DATA is enabled in the order of [0], [1], [2], and [3]. The address is switched per four cycles. As a consequence, four difference values of the 4Nth pixel, the (4N+1)-th pixel, the (4N+2)-th pixel, and the (4N+3)-th pixel are written in each of Addresses 0 to 3 of the pixel scale factor memory 17 in sixteen cycles.

In the example of FIG. 5, four difference values (i.e., "1", "0", "0", and "0") of the zeroth to third pixels are written in Address 0. Four difference values (i.e., "0", "0", "0", and "0") of the fourth to seventh pixels are written in Address 1. Four difference values (i.e., "1", "0", "0", and "0") of the eighth to eleventh pixels are written in Address 2. Four difference values (i.e., "0", "0", "0", and "0") of the twelfth to fifteenth pixels are written in Address 3.

When an input image is stored in the input memory 12 after the sixteen difference values are written in the pixel scale factor memory 17, the four scaling units 15-1 to 15-4 read, in parallel, four pieces of pixel data in the main scanning direction from the input memory 12 for each cycle. At the same time, the four scaling units 15-1 to 15-4 read, in parallel, four difference values of the 4Nth pixel, the (4N+1)-th pixel, the (4N+2)-th pixel, and the (4N+3)-th pixel from each of Addresses 0 to 3 of the pixel scale factor memory 17. Each of the four scaling units 15-1 to 15-4 adds "3", which is a value of the integer part P of the magnification S, to the difference value thus read, thereby restoring the value of the pixel scale factor H. With the value thus restored, each of the four scaling units 15-1 to 15-4 executes the scale process.

As described above, according to the present embodiment, the difference value (i.e., 1 or 0) between the pixel scale factor H and the integer P is stored in the pixel scale factor memory 17, thereby reducing the bit write enable and data bus width from sixteen bits to four bits.

Third Embodiment

Figure 6:
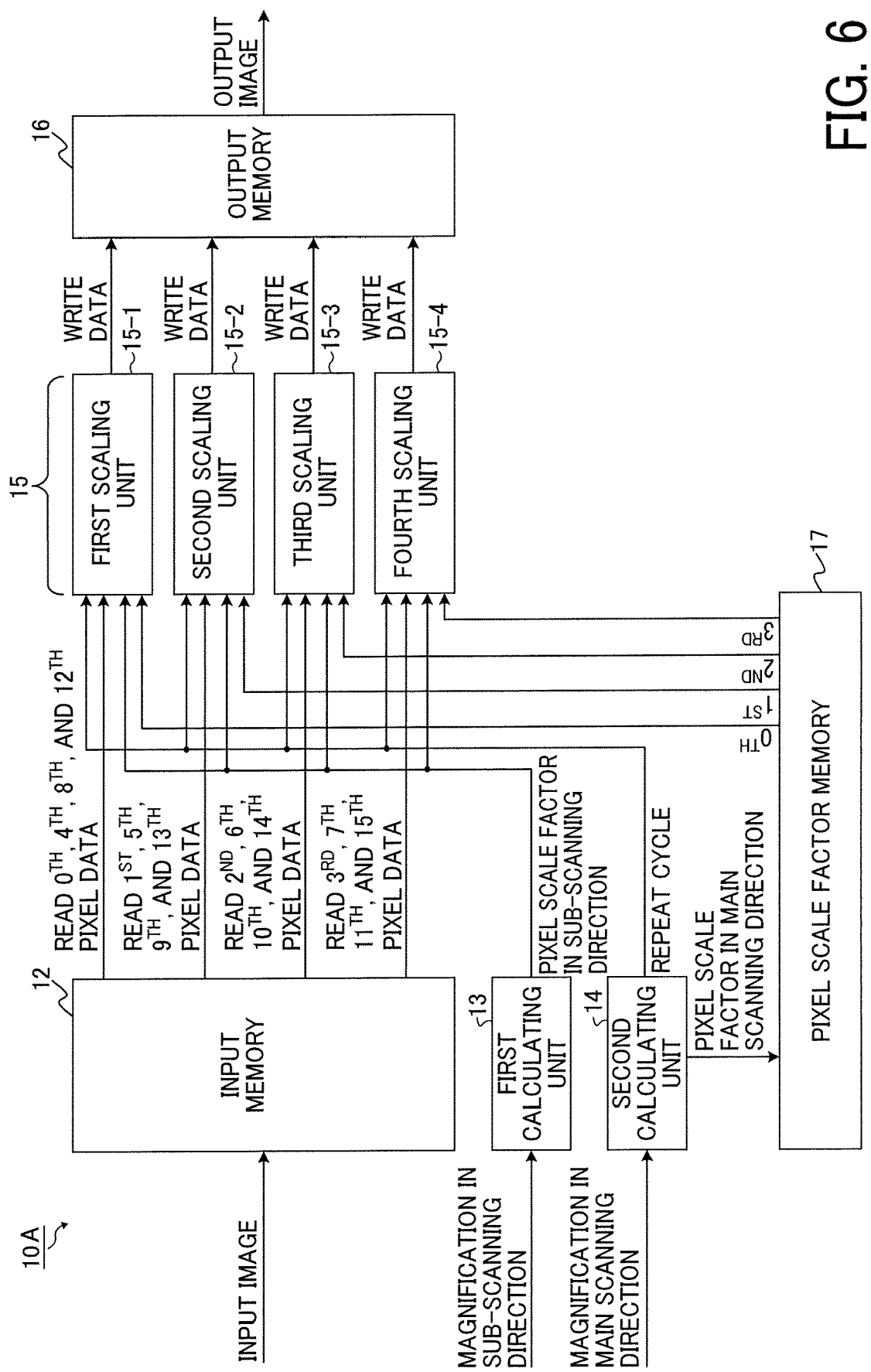
FIG. 6 is a functional block diagram of an image processor according to a third embodiment of the present disclosure.
Figure 7:
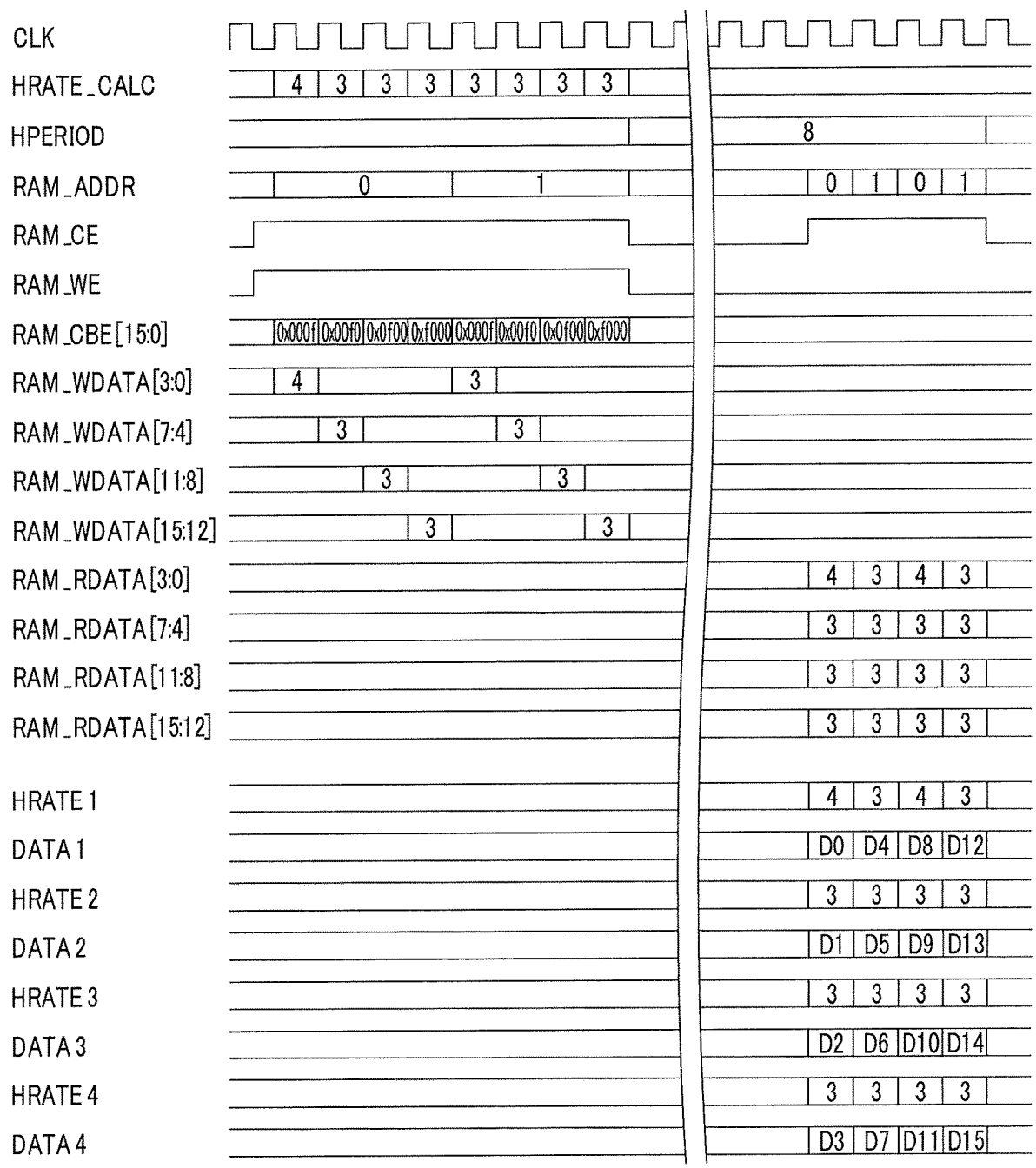
FIG. 7 is a timing chart of a scaling process executed by the image processor according to the third embodiment of the present disclosure.

Referring now to FIGS. 6 and 7, a description is given of a third embodiment of the present disclosure, concentrating on differences from the first embodiment.

FIG. 6 is a functional block diagram of an image processor 10A according to the third embodiment. FIG. 7 is a timing chart of a scaling process executed by the image processor 10A.

As described above, in the decimal scaling, the pixel scale factors are repeated in certain cycles. In other words, the pixel scale factors have a repeat cycle. In the first embodiment, the main-scanning pixel scale factors H for one line are stored in the pixel scale factor memory 17. By contrast, in the third embodiment, the main-scanning pixel scale factors H for one repeat cycle are stored in the pixel scale factor memory 17.

In the present embodiment, when completing calculation of the pixel scale factors H for one repeat cycle and storage of the pixel scale factors H thus calculated in the pixel scale factor memory 17, the second calculating unit 14 transmits a value of one repeat cycle (i.e., the number of pixels constructing a repeated unit of pixel scale factors H) to each of the four scaling units 15-1 to 15-4. For example, when the magnification S is 3.125 (i.e., S=3.125), the pixel scale factors H for one line are 4, 3, 3, 3, 3, 3, 3, 3, 4, 3, 3, 3, 3, 3, 3, and 3 in this order. In the present embodiment, when completing calculation of the pixel scale factors H of eight pixels, that is, the pixel scale factors H for one repeat cycle (i.e., 4, 3, 3, 3, 3, 3, 3, and 3) and storage of the eight pixel scale factors H thus calculated in the pixel scale factor memory 17, the second calculating unit 14 transmits "8" as the repeat cycle to each of the four scaling units 15-1 to 15-4.

When an input image is stored in the input memory 12 after the eight pixel scale factors H are written in the pixel scale factor memory 17 in order of pixel position, the four scaling units 15-1 to 15-4 read, in parallel, four pieces of pixel data in the main scanning direction from the input memory 12 for each cycle. At the same time, the four scaling units 15-1 to 15-4 read, in parallel, four pixel scale factors H of the 4Nth pixel, the (4N+1)-th pixel, the (4N+2)-th pixel, and the (4N+3)-th pixel from each of Addresses 0 and 1 of the pixel scale factor memory 17 to execute the scaling process. When reading all the eight pixel scale factors H according to the repeat cycle "8" transmitted, the four scaling units 15-1 to 15-4 return to the first reading position of the pixel scale factor memory 17 to read again, in parallel, four pixel scale factors H for each cycle. Thus, the four scaling units 15-1 to 15-4 repeats the reading process.

FIG. 7 illustrates a timing chart of the present embodiment, in which the magnification S is 3.125 (i.e., S=3.125). Note that, in FIG. 7, "HPERIOD" represents the repeat cycle of the main-scanning pixel scale factors H.

In FIG. 7, the value "8" of "HPERIOD" is determined at the time when the calculation of the pixel scale factors H for eight pixels is completed. Thereafter, the second calculating unit 14 does not calculate or store the pixel scale factor H in the pixel scale factor memory 17. On the other hand, with respect to the reading of the pixel scale factors H from the pixel scale factor memory 17, the address returns to "0" at the time when all the eight pixel scale factors H are read. The four scaling units 15-1 to 15-4 start reading again from the first reading position.

As described above, in the present embodiment, the pixel scale factors H for one repeat cycle alone are stored in the pixel scale factor memory 17, thereby reducing the processing time for calculation and storage of the pixel scale factors H in the pixel scale factor memory 17.

Fourth Embodiment

Figure 8:
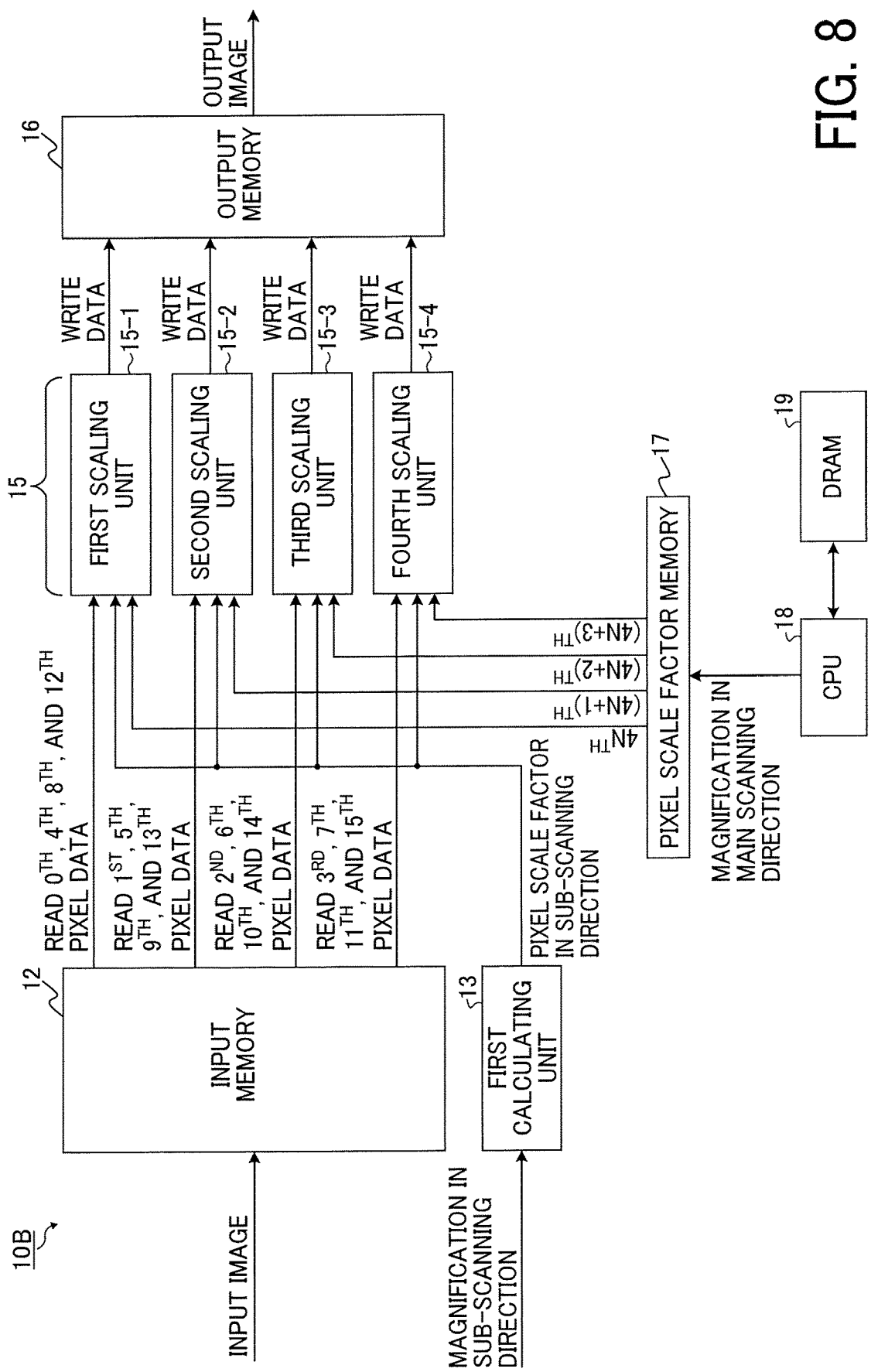
FIG. 8 is a functional block diagram of an image processor according to a fourth embodiment of the present disclosure.
Figure 9:
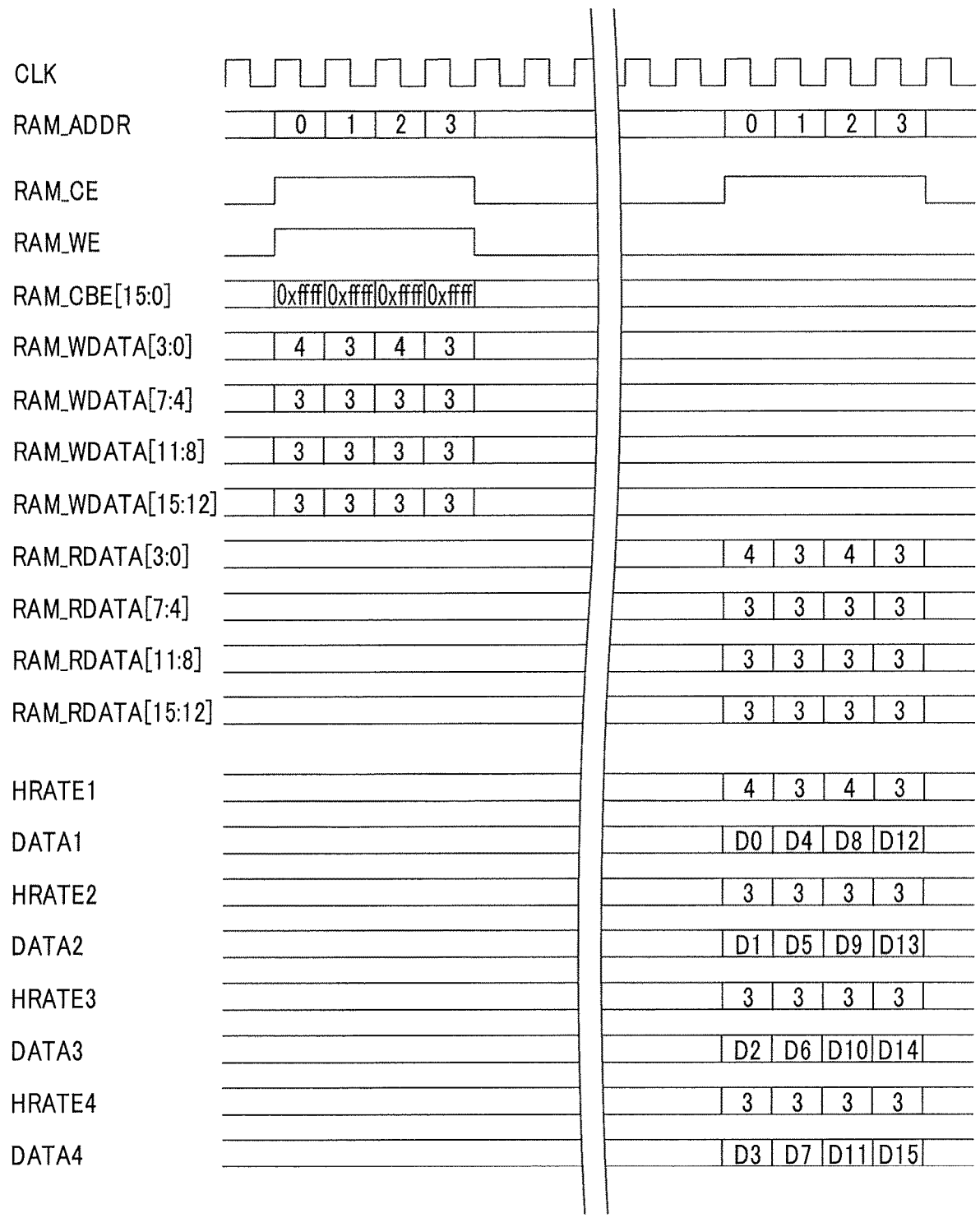
FIG. 9 is a timing chart of a scaling process executed by the image processor according to the fourth embodiment of the present disclosure.

Referring now to FIGS. 8 and 9, a description is given of a fourth embodiment of the present disclosure, concentrating on differences from the first embodiment.

FIG. 8 is a functional block diagram of an image processor 10B according to the fourth embodiment. FIG. 9 is a timing chart of a scaling process executed by the image processor 10B.

As illustrated in FIG. 8, the fourth embodiment is different from the first embodiment in that an external central processing unit (CPU) 18 calculates the pixel scale factor H and store the pixel scale factor H calculated in the pixel scale factor memory 17. With the CPU 18, the present embodiment reduces hardware (corresponding to the second calculating unit 14).

In addition, in the present embodiment, The CPU 18 temporarily retains, in a dynamic random access memory (DRAM) 19, the pixel scale factor H calculated in advance by software, so as to store the respective pixel scale factors H for multiple pixels at one time in the pixel scale factor memory 17. Accordingly, the present embodiment shortens the processing time taken to store the pixel scale factors H in the pixel scale factor memory 17, compared to the first embodiment in which the calculation and storage of the pixel scale factors H are sequentially performed with the hardware.

FIG. 9 illustrates a timing chart of the present embodiment, in which the magnification S is 3.125 (i.e., S=3.125). Note that, in the timing chart illustrated in FIG. 9, when the value of bit enable (i.e., RAM_CBE[15:0]) is "0xffff", all bits [15:0] of RAM_WDATA are enabled. As illustrated in FIG. 9, in the present embodiment, the pixel scale factors H for four pixels are written in one cycle in the pixel scale factor memory 17 via a 16-bit data bus, with all the sixteen bits as enabled data. Accordingly, the processing time taken to store the pixel scale factor H in the pixel scale factor memory 17 is shortened in the present embodiment.

According to the embodiment described above, the scaling speed is enhanced.

Although the present disclosure makes reference to specific embodiments, it is to be noted that the present disclosure is not limited to the details of the embodiments described above. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Specifically, for example, in the embodiments described above, the scaling unit 15 is constructed of the four equivalent scaling units 15-1 to 15-4. However, the number of scaling units constructing the scaling unit 15 is not limited to four provided that n-number of scaling units construct the scaling unit 15, where "n" is an integer not smaller than 2.

Thus, various modifications and enhancements are possible in light of the above teachings, without departing from the scope of the present disclosure. It is therefore to be understood that the present disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Any one of the above-described operations may be performed in various other ways, for example, in an order different from that described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by an ASIC, prepared by interconnecting an appropriate network of conventional component circuits or by a combination thereof with one or more conventional general purpose microprocessors and/or signal processors programmed accordingly.

What is claimed is:

1. An image processing apparatus comprising:
   a memory; and
   circuitry configured to:
      calculate a pixel scale factor for each of pixel positions in a main scanning direction of an input image for a line based on a magnification;
      calculate a difference value between the pixel scale factor calculated and a value of an integer part of the magnification;
      store, in the memory, the difference values calculated for the line in order of pixel position;
      read, in parallel, N-number of difference values of the difference values for the line in order of pixel position from the memory, in synchronization with parallel reading of N-number of pixels in the main scanning direction from the input image, where N represents an integer not smaller than 2;
      add the value of the integer part to each of the N-number of difference values read to restore N-number of pixel scale factors of the pixels scale factors for the line; and
      multiply, in parallel, the N-number of pixels read from the input image by the respective N-number of pixel scale factors restored.

* * * * *